(12) United States Patent
Kubota

(10) Patent No.: US 11,909,939 B2
(45) Date of Patent: Feb. 20, 2024

(54) METHOD OF GENERATING IMAGE DATA, METHOD OF PRODUCING DISPLAY, PROGRAM, COMPUTER-READABLE STORAGE MEDIUM, AND DISPLAY PRODUCTION SYSTEM

(71) Applicant: TOPPAN PRINTING CO., LTD., Tokyo (JP)

(72) Inventor: Masashi Kubota, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 337 days.

(21) Appl. No.: 17/330,824

(22) Filed: May 26, 2021

(65) Prior Publication Data

US 2021/0281714 A1    Sep. 9, 2021

Related U.S. Application Data

(63) Continuation of application No. PCT/JP2019/044315, filed on Nov. 12, 2019.

(30) Foreign Application Priority Data

Nov. 27, 2018    (JP) .................................. 2018-221490

(51) Int. Cl.
*H04N 1/60* (2006.01)
*H04N 1/52* (2006.01)

(52) U.S. Cl.
CPC .............. *H04N 1/603* (2013.01); *H04N 1/52* (2013.01)

(58) Field of Classification Search
CPC .................................. H04N 1/603; H04N 1/52
See application file for complete search history.

(56) References Cited

U.S. PATENT DOCUMENTS

2010/0245927 A1* 9/2010 Wong .................. H04N 1/4051
358/3.26
2017/0289400 A1 10/2017 Nakagawa
(Continued)

FOREIGN PATENT DOCUMENTS

EP    3 226 531 A1    10/2017
JP    H10-155093 A     6/1998
(Continued)

OTHER PUBLICATIONS

International Searching Authority, "International Search Report," issued in connection with International Patent Application No. PCT/JP2019/044315, dated Jan. 7, 2020.
(Continued)

*Primary Examiner* — William A Beutel
(74) *Attorney, Agent, or Firm* — Foley & Lardner LLP

(57) ABSTRACT

A method of generating image data by acquiring first image data having a tone value of each pixel for each color and generating second image data. Generating the second image data by selecting a first pixel of the first image data; binarizing the tone value of the first pixel in response to a comparison result showing that the tone value of the first pixel is greater than the first threshold, binarizing the tone value of the first pixel in response to a comparison result showing that the tone value of the first pixel is smaller than the second threshold, and binarizing the tone value of the first pixel in response to a comparison result showing that the tone value of the first pixel is equal to or less than the first threshold and is equal to or greater than the second threshold.

17 Claims, 11 Drawing Sheets

(56) References Cited

U.S. PATENT DOCUMENTS

2019/0016151 A1    1/2019  Kishimoto et al.
2020/0099821 A1*   3/2020  Sakai .................. H04N 1/6072

FOREIGN PATENT DOCUMENTS

| JP | 2001-157041 A | 6/2001 | | |
| JP | 2004-304543 A | 10/2004 | | |
| JP | 2011-230473 A | 11/2011 | | |
| JP | 2013-038523 A | 2/2013 | | |
| JP | 2014-008746 A | 1/2014 | | |
| JP | 2014008746 A | * | 1/2014 | ............. B42D 25/00 |
| WO | WO-2017/146199 A1 | 8/2017 | | |

OTHER PUBLICATIONS

International Searching Authority, "Written Opinion," issued in connection with International Patent Application No. PCT/JP2019/044315, dated Jan. 7, 2020.
European Extended Search Report, dated Dec. 10, 2021, issued in corresponding European Patent Application No. 19889039.4, (11 pages).

* cited by examiner

FIG.14

| FIRST THRESHOLD | RED COMPONENT | GREEN COMPONENT | BLUE COMPONENT |
|---|---|---|---|
| 10 | 6371334 | 7826168 | 8577279 |
| 20 | 6371334 | 7826168 | 8576843 |
| 30 | 6370709 | 7817235 | 8552049 |
| 40 | 6361831 | 7774363 | 8436950 |
| 50 | 6335633 | 7672492 | 8238647 |
| 60 | 6284068 | 7556220 | 8015884 |
| 70 | 6215831 | 7417836 | 7753381 |
| 80 | 6137130 | 7250871 | 7470500 |
| 90 | 6057344 | 7077426 | 7208686 |
| 100 | 5965884 | 6903971 | 6941193 |
| 110 | 5873615 | 6736850 | 6704874 |
| 120 | 5789516 | 6588327 | 6512074 |
| 130 | 5710186 | 6460473 | 6348240 |
| 140 | 5653246 | 6365534 | 6226763 |
| 150 | 5619531 | 6299529 | 6122742 |
| 160 | 5618723 | 6251260 | 6045687 |
| 170 | 5646659 | 6244662 | 6004567 |
| 180 | 5705813 | 6253546 | 5968983 |
| 190 | 5796358 | 6276574 | 5946023 |
| 200 | 5909991 | 6308411 | 5939860 |
| 210 | 6041325 | 6350321 | 5934882 |
| 220 | 6191325 | 6408688 | 5950090 |
| 230 | 6461740 | 6662337 | 6072766 |
| 240 | 7212785 | 7370679 | 6708836 |
| 250 | 7750357 | 7767709 | 7169170 |

| SECOND THRESHOLD | RED COMPONENT | GREEN COMPONENT | BLUE COMPONENT |
|---|---|---|---|
| 0 | 5618723 | 6244662 | 5934882 |
| 10 | 5579392 | 6057322 | 5756836 |
| 20 | 5523205 | 5932429 | 5519440 |
| 30 | 5506349 | 6026099 | 5341394 |
| 40 | 5534442 | 6150992 | 5430417 |
| 50 | 5540061 | 6307109 | 5697487 |
| 60 | 5551298 | 6494448 | 6172277 |
| 70 | 5562536 | 6681788 | 6528370 |

METHOD OF GENERATING IMAGE DATA, METHOD OF PRODUCING DISPLAY, PROGRAM, COMPUTER-READABLE STORAGE MEDIUM, AND DISPLAY PRODUCTION SYSTEM

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2019/044315, filed on Nov. 12, 2019, which is based upon and claims the benefit of priority to Japanese Patent Application No. 2018-221490, filed on Nov. 27, 2018, the disclosures of which are incorporated herein by reference in their entireties.

TECHNICAL FIELD

The present invention relates to a method of generating image data, a method of producing a display, a computer-readable storage medium, and a display production system.

BACKGROUND

Image recording by thermal transfer can be used, for example, for on-demand production of a display by using raster image data. As an image recording method using thermal transfer, there are known, for example, a fusion thermal transfer recording method or a sublimation thermal transfer recording method (PTLs 1 and 2).

The fusion thermal transfer recording method uses a transfer foil including a substrate and a transfer layer separably supported by the substrate. The transfer layer includes an adhesive layer on the outermost surface. This transfer foil, with the adhesive layer brought into contact with a transfer target, is pressed against the transfer target. In this state, the transfer foil and the transfer target are heated and then the substrate is separated from the transfer target. In this way, the portions of the transfer layer subjected to heating (termed display elements hereinafter) are transferred from the substrate to the transfer target.

The transfer layer may have a multilayer structure. In this case, the transfer layer may be provided, for example, with a diffraction grating. The diffraction grating can be appropriately designed in terms of the grating constant or the length or direction of the grooves to display various colors, such as red, green, and blue, under specific illumination and observation conditions. Accordingly, use of a transfer foil, in which the transfer layer includes a diffraction grating, can achieve a display, for example, which displays a color image with diffracted light.

To form a color image by a diffraction grating, the fusion transfer recording method needs to be used. When the fusion transfer material is transferred to the transfer target, the highly peelable material comes on the surface of the transfer target. Depending on a desired color expression, two or more transfer materials may need to be transferred in an overlapping manner. However, it is difficult to transfer a small-area transfer material because the surface of the transfer material is highly peelable. Therefore, for the formation of a color image by a diffraction grating, the image preferably has an image construction with as large dots as possible, that is, a binary image.

As described above, the color image recorded as a hologram image on the display is preferably a binary image. The hologram image is a security image, and thus needs to be as close to the original image as possible. There are various methods of converting a multi-value image to a binary image (see PTL 3). An error diffusion method is most commonly used for generating a binary image.
[Citation List] [Patent Literature] [PTL 1] JP 2011-230473 A; [PTL 2] JP 2014-8746 A; [PTL 3] JP 2004-304543 A.

SUMMARY OF THE INVENTION

Technical Problem

In an error diffusion method, error diffusion is generally directed from the upper left to lower right of an image. The lower right pixel has a larger ratio of the quantity of accepted error to the quantity of discharged error than the upper left pixel. Thus, the information of the image accumulates from the upper left to lower right of the image, which causes a difference in the amount of information between the upper left part and the lower right part of the image. The amount of information varies among the positions on the image so that the reproducibility of the original image in the binarized image varies among the positions on the image. Such a difference in the amount of information can be mitigated to a certain degree by diffusing the error using three or more tone levels. However, since the image to be a hologram image needs to be a binary image, the difference in the amount of information needs to be mitigated still in a binary representation.

Thus, an object of the present invention is to provide a technique for improving reproducibility of an original image in a binarized image.

Solution to Problem

According to a first aspect of the present invention, there is provided a method of generating image data including: acquiring, as data of a color image represented in two or more colors, first image data having a tone value of each pixel for each of the colors; and based on the first image data, generating second image data having a binarized tone value of each pixel for each of the colors, wherein generating the second image data includes: selecting a first pixel from a plurality of pixels constituting the first image data; comparing the tone value of the first pixel with at least either of a first threshold and a second threshold smaller than the first threshold; binarizing the tone value of the first pixel by a first binarization process in response to a comparison result showing that the tone value of the first pixel is greater than the first threshold; binarizing the tone value of the first pixel by a second binarization process different from the first binarization process in response to a comparison result showing that the tone value of the first pixel is smaller than the second threshold; and binarizing the tone value of the first pixel by a third binarization process different from the first binarization process and the second binarization process in response to a comparison result showing that the tone value of the first pixel is equal to or less than the first threshold and is equal to or greater than the second threshold.

According to a second aspect of the present invention, there is provided a method of producing a display, including transferring two or more types of display elements each including diffractive structures and displaying colors different from each other onto a transfer target, based on the second image data obtained by the method of generating image data according to the first aspect.

According to a third aspect of the present invention, there is provided a display which is obtained by the production method according to the second aspect.

According to a fourth aspect of the present invention, there is provided a program for causing a computer to execute: a step of acquiring, as data of a color image represented in two or more colors, first image data having a tone value of each pixel for each of the colors; and a step of, based on the first image data, generating second image data having a binarized tone value of each pixel for each of the colors, wherein the step of generating the second image data includes: a step of selecting a first pixel from a plurality of pixels constituting the first image data; a step of comparing the tone value of the first pixel with at least either of a first threshold and a second threshold smaller than the first threshold; a step of binarizing the tone value of the first pixel by a first binarization process in response to a comparison result showing that the tone value of the first pixel is greater than the first threshold; a step of binarizing the tone value of the first pixel by a second binarization process different from the first binarization process in response to a comparison result showing that the tone value of the first pixel is smaller than the second threshold; and a step of binarizing the tone value of the first pixel by a third binarization process different from the first binarization process and the second binarization process in response to a comparison result showing that the tone value of the first pixel is equal to or less than the first threshold and equal to or is greater than the second threshold.

According to a fifth aspect of the present invention, there is provided a computer readable storage medium in which the program according to the fourth aspect is recorded.

According to a sixth aspect of the present invention, there is provided a display production system including: a computer in which the program according to the fourth aspect is stored; and a transfer device that transfers two or more types of display elements onto a transfer target based on the second image data, the display elements each including diffractive structure and displaying color different from each other.

Advantageous Effects of the Invention

According to the present invention, it is possible to improve the reproducibility of the original image in the binarized image.

BRIEF DESCRIPTION OF THE DRAWINGS

FIG. 14 is a table indicating a relationship of summed differences between the binarized image and the original image with each magnitude of the first threshold in the example.

DETAILED DESCRIPTION

Embodiments of the present invention of will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

With reference to the accompanying drawings, some embodiments of the present invention will be described.

Figure 1:
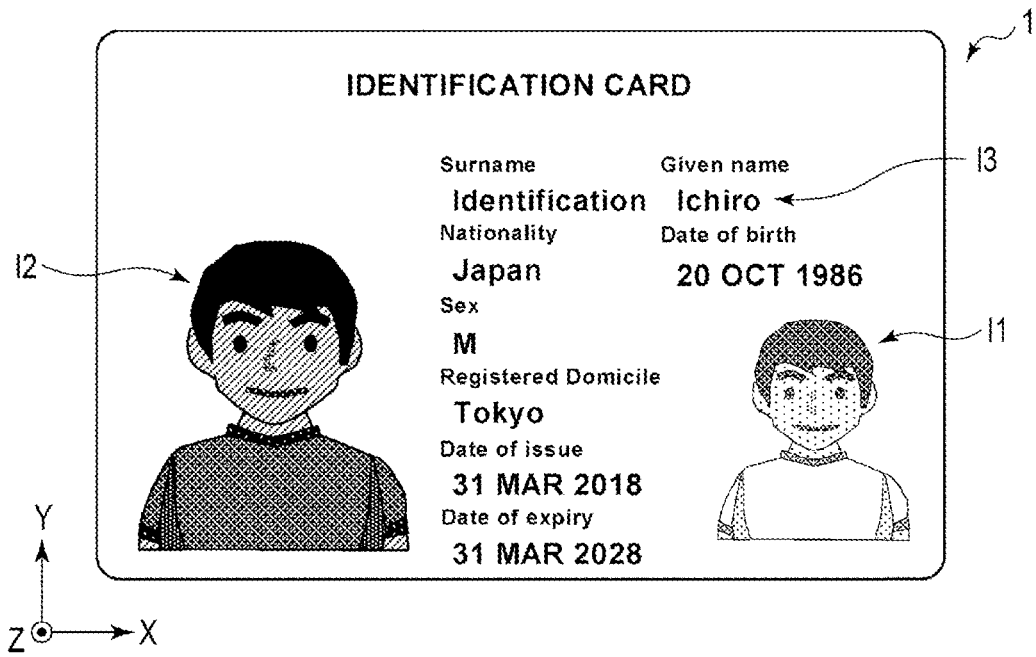
FIG. 1 is a schematic plan view illustrating a display according to an embodiment of the present invention.
Figure 2:
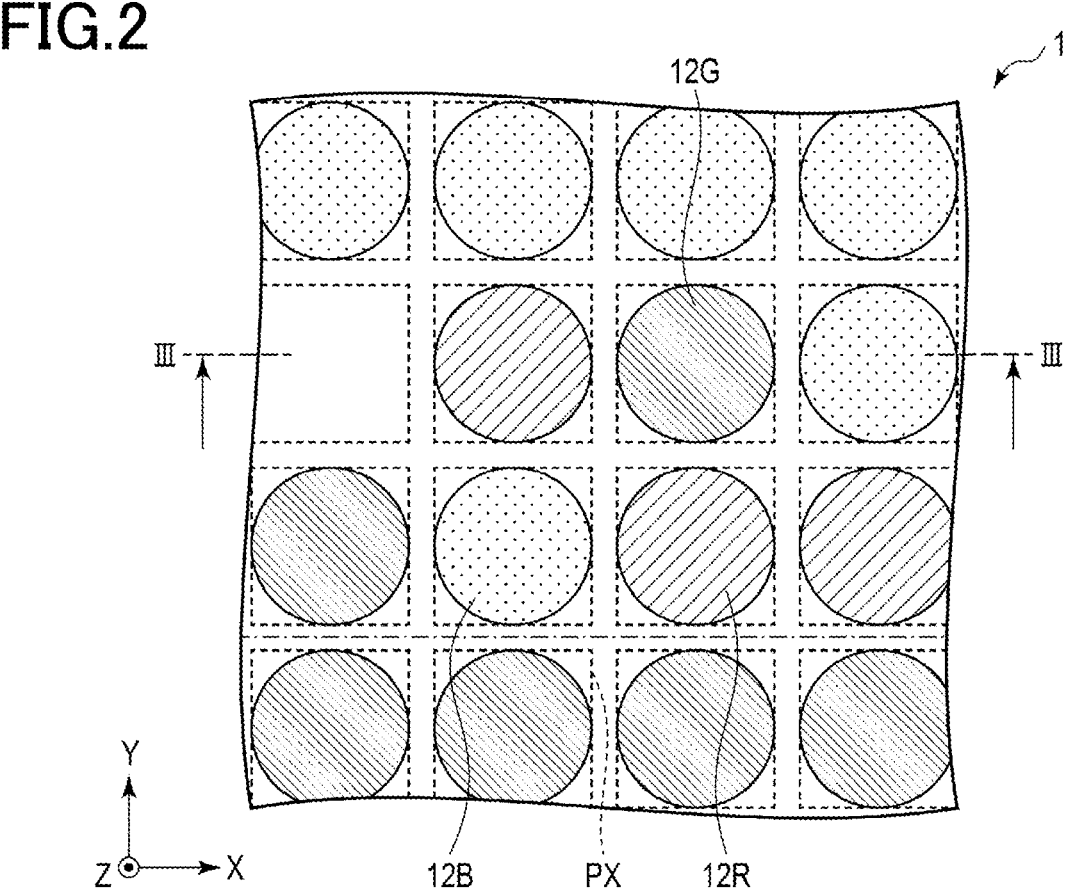
FIG. 2 is an enlarged partial plan view illustrating the display shown in FIG. 1.
Figure 3:
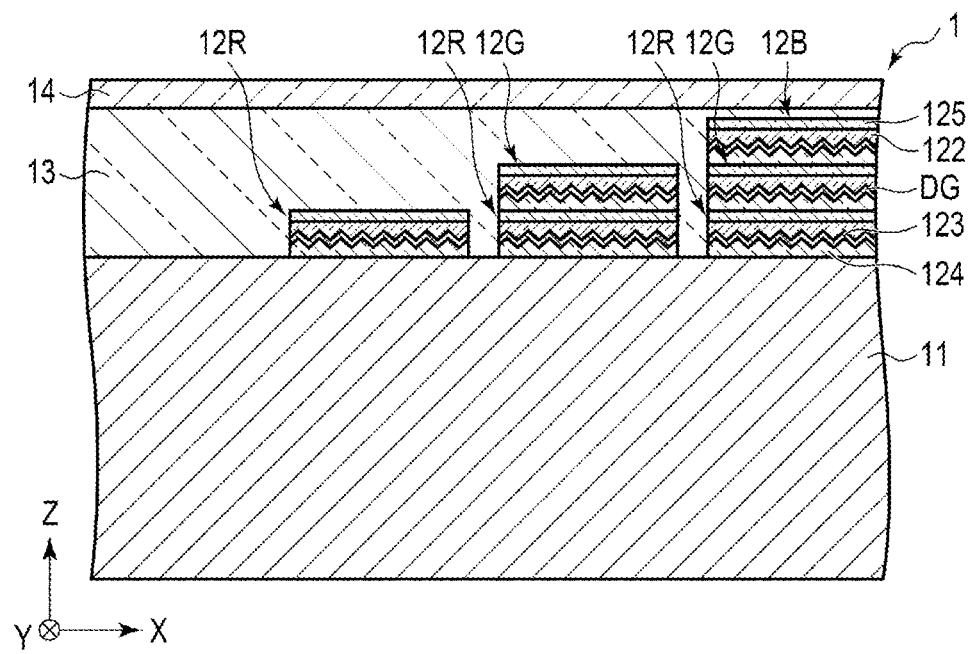
FIG. 3 is a cross-sectional view taken along the line of the display shown in FIG. 2.
Figure 4:
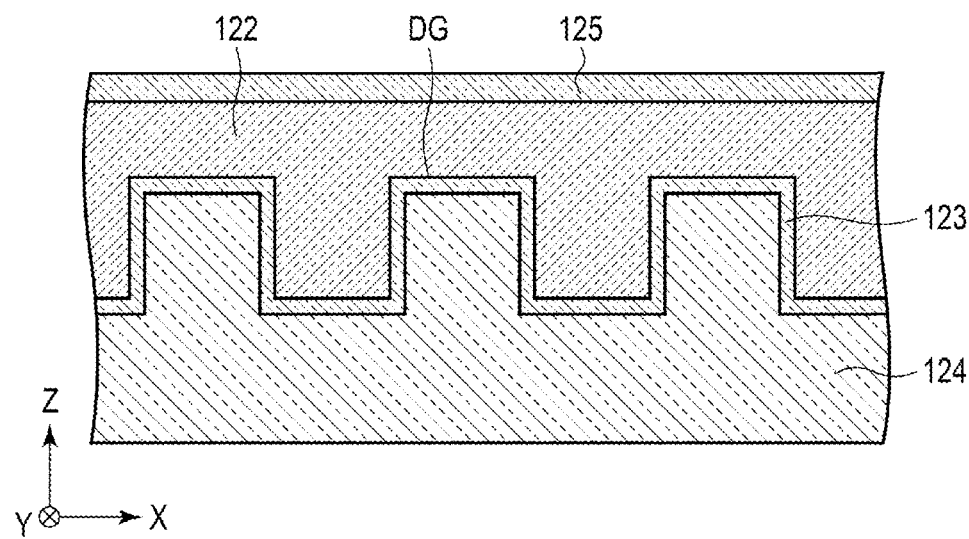
FIG. 4 is a schematic cross-sectional view illustrating an example of a structure that can be used for display elements included in the display shown in FIGS. 1 to 3.

FIG. 1 is a schematic plan view illustrating a display according to an embodiment of the present invention. FIG. 2 is an enlarged partial plan view illustrating the display shown in FIG. 1. FIG. 3 is a cross-sectional view taken along the line of the display shown in FIG. 2. FIG. 4 is a schematic cross-sectional view illustrating an example of a structure that can be used for display elements included in the display shown in FIGS. 1 to 3. It should be noted that the X direction is a direction parallel to the display surface of a display 1, the Y direction is a direction parallel to the display surface of the display 1 and perpendicular to the X direction, and the Z direction is a direction perpendicular to the X and Y directions.

FIGS. 1 to 3 show a display 1 serving as an identification (ID) card. The display 1 may be an employee ID card, a student ID card, or a driver's license. The configuration explained for the display 1 can be applied to passports, or valuable securities such as banknotes.

As shown in FIG. 3, the display 1 includes a support 11, display elements 12R, 12G and 12B, a print layer, not shown, a resin layer 13, and a protective layer 14.

The support 11 is a transfer target. Materials that can be used for the support 11 may be, for example, plastic boards, paper, or combinations thereof. The support 11 may be provided with an image-receiving layer on the surface thereof to assist thermal transfer. The support 11 may incorporate an integrated circuit (IC) chip, an antenna enabling contactless communication with the IC chip, or may incorporate other components.

As shown in FIG. 1, an image I1, an image I2, and an image I3 are recorded on the support 11.

The image I1 is displayed using diffracted light.

In the region on the support 11 where the image I1 is recorded, pixels PX shown in FIG. 2 are arranged in a matrix. As an example, herein, the pixels PX are assumed to be arranged in the X and Y directions.

The pixels PX include pixels which include one or more types of the display elements 12R, 12G and 12B, and pixels which include none of the display elements 12R, 12G and 12B.

In the pixels PX each including one or more types of the display elements 12R, 12G and 12B, the number of the display elements of the same type is only one. As shown in FIG. 3, in the pixels PX each including two or more types of the display elements 12R, 12G and 12B, the display elements are laminated with each other. As an example, herein, the display elements 12R, 12G and 12B are assumed to be laminated on the support 11 in this order.

The display elements 12R, 12G and 12B display colors that are different from each other. Each pixel PX can display various colors by additive color mixing of diffracted light which emerges from the arranged display elements.

As an example, the display elements 12R, 12G and 12B are assumed to respectively display red, green, and blue. Specifically, herein, the display elements 12R, 12G and 12B are assumed to emit diffracted light of red, green, and blue colors toward the observer under specific illumination and observation conditions.

The display elements 12R are identical to each other in shape and size. The display elements 12G are identical to each other in shape and size. The display elements 12B are identical to each other in shape and size.

The display elements 12R, 12G, and 12B are identical to each other in shape and size. If the display elements 12R, 12G, and 12B are identical to each other in shape and size, the display elements 12R, 12G, and 12B can be stably transferred in the production of the display 1, without impairing the brightness of the first image I1. As an example, herein, the display elements 12R, 12G and 12B are assumed to have circular shapes with the diameters equal to each other as viewed in the Z direction. The display elements 12R, 12G, and 12B may be different in shape or size.

In the case where adjacent pixels PX each include one or more of the display elements 12R, 12G, and 12B, the display elements included in one pixel PX and the display elements included in another pixel PX may be spaced apart from each other as shown in FIG. 2. Alternatively, in this case, the display elements included in one pixel PX and the display elements included in the other pixel PX may be in contact with each other.

The arrangement of two or more types of the display elements 12R, 12G, and 12B in the pixels PX is not limited to the concentric lamination of the display elements in the Z direction as illustrated in FIG. 3. Two or more types of the display elements 12R, 12G, and 12B in the pixels PX may be arranged to overlap partially, for example, overlap by half. Alternatively, two or more types of the display elements 12R, 12G, and 12B in the pixels PX may be arranged so as not to overlap together.

As shown in FIG. 3, the display elements 12R, 12G, and 12B each include a relief structure forming layer 122, a reflective layer 123, an adhesive layer 124, and a protective layer 125.

The relief structure forming layer 122 is a transparent resin layer. The relief structure forming layer 122 has a first major surface on which a relief type diffractive structure DG is provided. For example, the diffractive structure DG may be a diffraction grating or a hologram. According to an example, the diffractive structure DG may include straight or arcuate grooves arranged in the width direction. In a cross section perpendicular to the length direction of the grooves, the diffractive structure DG may have a triangular wave shape as shown in FIG. 3, or may have a rectangular wave shape as shown in FIG. 4, or may have a sinusoidal shape.

The pitch, i.e., the lattice constant, of the grooves affects the colors displayed by the diffractive structure DG under specific illumination and observation conditions. The display elements 12R, 12G, and 12B have respective diffractive structures DG whose lattice constants are different from each other. The diffractive structures DG of the display elements 12R, 12G, and 12B are designed so that the observer can perceive visible light under specific illumination and observation conditions. The lattice constants are in the range of several hundreds of nanometers to several micrometers.

The depth of the grooves affects the diffraction efficiency of the diffractive structure DG. For example, the grooves may have a depth in the range of several tens of nanometers to several hundreds of nanometers.

For example, the relief structure forming layer 122 may be made of a thermosetting resin or an ultraviolet curable resin or both of them. For example, a relief structure forming layer 122 made of a thermosetting resin can be obtained by pressing a plate against a thermosetting resin layer, irradiating the resin layer with ultraviolet rays in this state, and then releasing the plate from the resin layer. For example, a relief structure forming layer 122 made of a thermosetting resin can be obtained by pressing a plate against a thermosetting resin layer, heating the resin layer in this state, and then releasing the plate from the resin layer.

The reflective layer 123 is provided to the first major surface of the relief structure forming layer 122 provided with the diffractive structure DG. The reflective layer 123 has a surface shape conforming to the diffractive structure DG of the relief structure forming layer. The reflective layer 123 is provided to enhance the diffraction efficiency of the diffractive structure DG.

The reflective layer 123 is a transparent reflective layer that allows visible light to be transmitted therethrough. Materials that can be used for the reflective layer 123 may be, for example, transparent dielectric materials, such as zinc sulfide and zinc selenide. The reflective layer 123 may have a monolayer structure, or may have a multilayer structure. In the case of the latter, a multilayer film may be used as the reflective layer 123. In the multilayer film, in this case, a plurality of transparent dielectric layers are laminated so that adjacent layers have different refractive indices.

Of the display elements 12R, 12G, and 12B, the element positioned farthest from the observer when laminated does not have to include a reflective layer 123 which is transparent. For example, such a reflective layer 123 may be a metal layer made of aluminum, gold or silver, or an alloy thereof.

The reflective layer 123 may be formed, for example, by a vapor deposition method, such as sputtering or vacuum vapor deposition.

The adhesive layer 124 is formed on the reflective layer 123. The adhesive layer 124 is a transparent resin layer. For example, the adhesive layer 124 may be made of a thermoplastic resin. Materials that can be used for the adhesive layer 124 may be, for example, an epoxy resin, polyester, vinyl chloride, or polyvinyl acetate. Highly adhesive materials have high viscosity. Therefore, if the adhesive layer 124 is formed only using such a material, good suitability to foil tearing is not necessarily achieved. If a mixture of the above resin and microparticles such as of a filler is used as a material for the adhesive layer 124, even better suitability to foil tearing can be achieved compared to the case where only a resin is used as the material.

The adhesion between the reflective layer 123 and the adhesive layer 124 may not necessarily be sufficient. In such a case, an anchor coat layer may be provided between the reflective layer 123 and the adhesive layer 124 to enhance adhesion therebetween.

The protective layer 125 is provided to a second major surface of the relief structure forming layer 122 facing away from the surface provided with the diffractive structure DG. The protective layer 125 is a transparent resin layer. The protective layer 125 protects the relief structure forming layer 122 or other components from physical damage, chemicals, or the like. Low adhesion of the protective layer 125 to the substrate of a transfer foil described later can facilitate transfer of the display elements. Materials that can be used for the protective layer 125 may be, for example, acrylic resins or epoxy resins. These materials may be used by mixing a polyester therewith to control adhesion.

The image I2 shown in FIG. 1 is displayed using at least one of a dye and/or a pigment. In this example, the image I2 is equal in shape to the image I1. Specifically, herein, the image I1 and the image I2 include facial images of the same person.

The image I2 may have a shape different from that of the image I1. In this example, the image I2 has a larger size than the image I1. However, these images may have the same size, or the image I2 may have a smaller size than that of the image I1. The image I2 may be omitted.

The third image I3 is displayed using at least one of a dye and/or a pigment. In this example, the image I3 includes character strings representing the personal information of the person displayed by the images I1 and I2, or other information. The image I3 may further include another image such as of a pattern, diagram, photograph, or the like. The image I3 may be omitted.

The support 11 has regions thereon where the images I2 and I3 are recorded. These regions are each provided with a print layer containing a dye and/or a pigment. The print layers respectively display the images I2 and I3. For example, the print layer may be formed by using one or more methods from among a fusion thermal transfer recording method, a sublimation thermal transfer recording method, and a recording method, such as screen printing, using a printing ink.

Part of the image I2 may be recorded making use of carbonization caused by laser beam irradiation. Part or all of the image I3 may be recorded making use of carbonization caused by laser beam irradiation.

The resin layer 13 shown in FIG. 3 covers the entirety of a major surface of the support 11 where the image I1, the image I2, and the image I3 are recorded. The resin layer 13 adheres the protective layer 14 to the support 11.

The resin layer 13 is made of a transparent resin. As the transparent resin, for example, the materials mentioned for the adhesive layer 124 may be used.

The resin layer 13 may cover only part of the major surface, e.g., only the regions where the image I1, the image I2, and the image I3 are recorded and the regions surrounding these images. The resin layer 13 may be omitted.

The protective layer 14 faces the entirety of the major surface of the support 11 where the image I1, the image I2, and the image I3 are recorded, with the resin layer 13 therebetween. The protective layer 14 protects the image I1, the image I2, and the image I3 from physical damage, chemicals, or the like. As the materials for the protective layer 14, for example, the materials mentioned for the protective layer 125 may be used.

The protective layer 14 may cover only part of the major surface, e.g., only the regions where the image I1, the image I2, and the image I3 are recorded and the regions surrounding these images. The protective layer 14 may be omitted.

Next, a method of producing the display 1 will be described.

Figure 5:
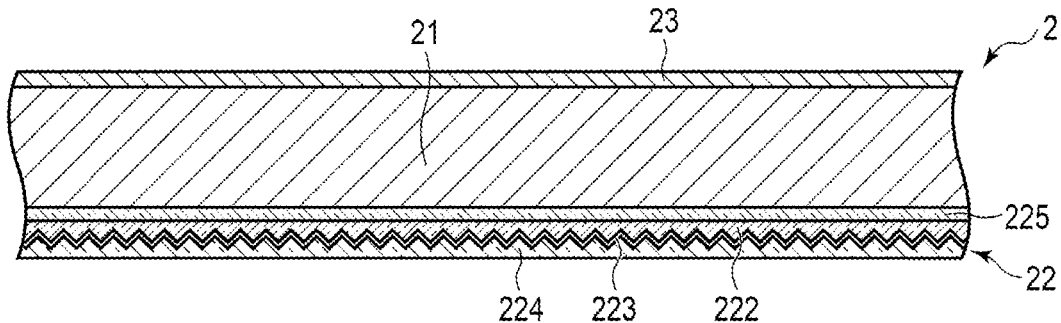
FIG. 5 is a schematic cross-sectional view illustrating an example of a transfer foil that can be used for producing the display shown in FIGS. 1 to 3.

FIG. 5 is a schematic cross-sectional view illustrating an example of a transfer foil that can be used for producing the display shown in FIGS. 1 to 3.

FIG. 5 shows a transfer foil 2 including a substrate 21, a transfer layer 22 and a back coat layer 23.

The substrate 21 is a film having a first major surface which separably supports the transfer layer 22. As the substrate 21, for example, a polyethylene terephthalate film may be used.

The transfer layer 22 includes a relief structure forming layer 222, a reflective layer 223, an adhesive layer 224 and a protective layer 225. Parts of the transfer layer 22 corresponds to any of the display elements 12R, 12G, and 12B shown in FIGS. 2 and 3. Specifically, the relief structure forming layer 122, the reflective layer 123, the adhesive layer 124 and the protective layer 125 are respectively parts of the relief structure forming layer 222, the reflective layer 223, the adhesive layer 224 and the protective layer 225.

The back coat layer 23 is provided to a second major surface, or a rear surface, of the substrate 21 facing away from the surface provided with the transfer layer 22. The back coat layer 23, which directly contacts a thermal head, is required to have high heat resistance.

The back coat layer 23 can be obtained, for example, by applying a material containing an ultraviolet curable resin, an acrylic resin and an isocyanate curing agent as main resins, and irradiating the coating film with ultraviolet rays. The back coat layer 23 is preferred to have a thickness in the range of approximately 0.2 µm to approximately 2.0 µm. It is required that the friction between the back coat layer 23 and the thermal head is small. Therefore, the back coat layer 23 may contain wax to obtain good lubrication with the thermal head, or may contain talc or filler to reduce the contact area with the thermal head.

Figure 6:
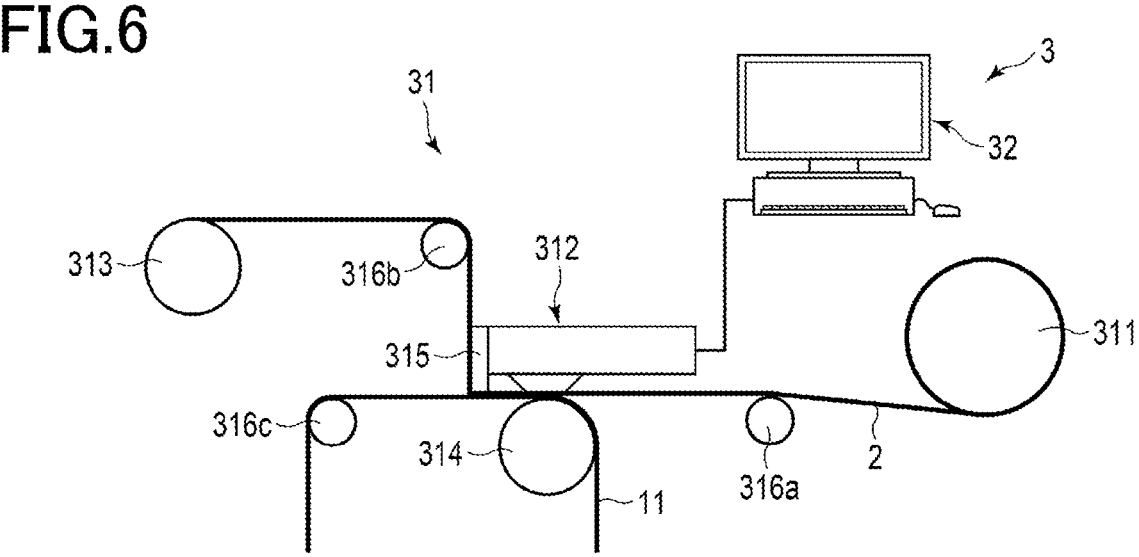
FIG. 6 is a schematic diagram illustrating a production system for a display according to an embodiment of the present invention.
Figure 7:
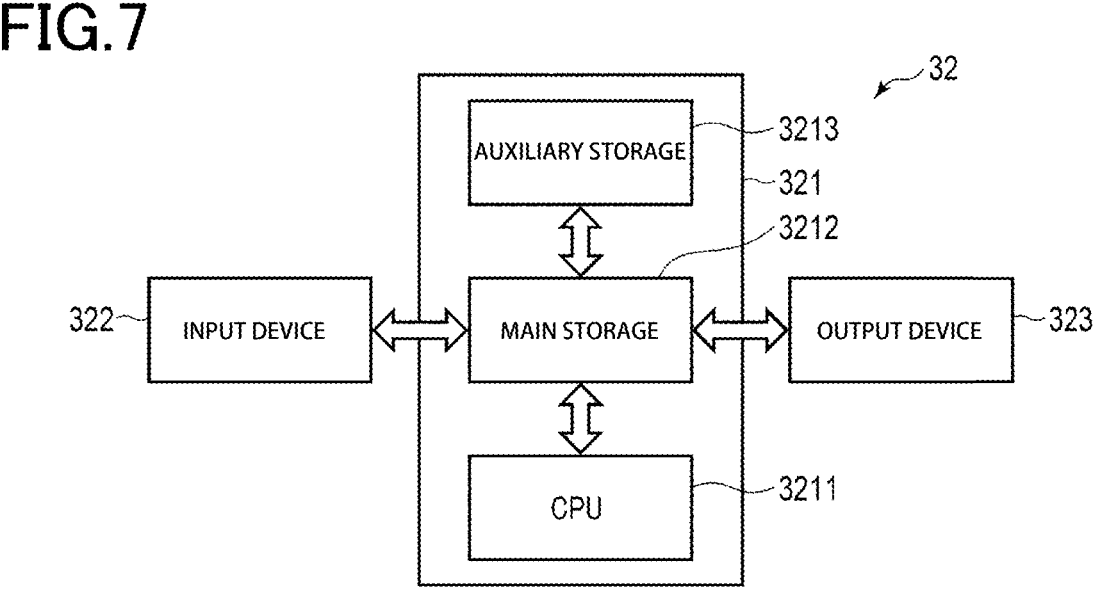
FIG. 7 is a block diagram illustrating part of the production system shown in FIG. 6.

FIG. 6 is a schematic diagram illustrating a production system for a display according to an embodiment of the present invention. FIG. 7 is a block diagram illustrating part of the production system shown in FIG. 6.

FIG. 6 shows a system 3 for producing the display 1.

FIG. 6 shows the production system 3 including a transfer device 31 and a computer 32.

The transfer device 31 is a device that, based on the image data obtained by a method of generating image data described later, transfers two or more types of display elements that each include the diffractive structure DG and display different colors, onto the support 11. The display 1 is obtained by such a production method implemented by the transfer device 31.

The transfer device 31 includes an unwinding part 311, a thermal head 312, a take-up part 313, a platen roller 314, a release plate 315, and guide rollers 316a to 316c.

The unwinding part 311 unwinds the transfer foil 2 wound about an unwinding core. The unwinding part 311 removably supports the unwinding core about which the transfer foil 2 is wound, and includes an unwinding shaft that is designed to keep the torque constant during the transfer operation. The unwinding shaft applies tension to the transfer foil 2 while it is unwound. For example, a generally used fixed-torque limiter is used for controlling the torque. Alternatively, a variable torque limiter that can change torque by controlling the friction or the like may be used. Furthermore, for the reason of reusing the transfer foil 2 or other reasons, a motor may be attached to the unwinding shaft, and the current supplied to the motor may be controlled to control the torque.

The transfer foil 2 unwound from the unwinding part 311 and guided by the guide rollers 316a and 316b is taken up on the take-up core of the take-up part 33. The take-up part 313 includes a take-up shaft and a take-up mechanism. The take-up shaft includes a take-up core which is removably attached thereto to wind the used transfer foil 2. The take-up mechanism includes a motor or the like which rotates the take-up shaft to take up the transfer foil 2 about the take-up core. The take-up part 33 is usually provided with a torque limiter between the take-up shaft and the take-up core to perform winding at constant torque.

When controlling torque during unwinding and winding of the transfer foil 2, it is preferred to make use of the diameter of the roll of the transfer foil 2 wound about the unwinding core and the diameter of the roll of the transfer foil 2 wound about the take-up core. Rotary encoders may be respectively provided to the unwinding part 311 and the take-up part 313, and the outputs of these encoders may be analyzed to calculate the above diameters and control torque even more accurately.

If the support 11 as a transfer target is in a roll form, unwinding and winding thereof can be performed under the same torque control as described for the transfer foil 2.

The feed rates of the support 11 and the transfer foil 2 are required to exactly match each other. Therefore, it is preferred that the unwinding part or the like that unwinds the support 11 is provided with a rotary encoder similar to one described for the transfer foil 2, and the roll diameter is constantly monitored to perform control under which the same feed rates are kept for the support 11 and the transfer foil 2.

If the support 11 has rigidity to some extent as paper does, the support 11 may be conveyed in a sheet form. Also in this case, the conveying speed is preferred to be controlled as described above.

The transfer foil 2 and the support 11 which are synchronously conveyed in this way are sandwiched between the thermal head 312 and the platen roller 314 to bring the transfer layer 22 of the transfer foil 2 into contact with the support 11, and thermally pressed against each other. Through this process, portions of the transfer layer 22 are transferred to the support 11.

The thermal head 312 heats the transfer foil 2. The thermal head 312 contains microresistors arranged in an array. These resistors generally have a size in the range of several tens of micrometers to several hundreds of micrometers. Current can be independently passed through these resistors. During transfer operation, current is passed through these resistors according to data to instantaneously generate heat in the resistors. Due to the generated heat, portions of the transfer layer 22 are transferred to the support 11.

In general, thermal heads have surfaces on which ceramics are deposited in the thickness of several tens of micrometers to protect the resistors. Vapor-deposited materials include, for example, SiC and SiON having high durability, and materials obtained by mixing these materials with other materials.

The platen roller 314 is disposed adjacent to the thermal head 312 sandwiching the transfer foil 2 and the support 11 therebetween. The platen roller 314 assists the heating performed by the thermal head 312. Furthermore, the platen roller 314 applies pressure to the transfer foil 2 and the support 11, together with the thermal head 312.

For example, the platen roller 314 has a structure in which a resin layer covers a metal shaft. The heat of the thermal head 312 is substantially directly transferred to the platen roller 314. Therefore, a resin having good heat resistance may desirably be used for the resin layer of the platen roller 314.

In the transfer device 31, the feed amount of the transfer foil 2 and the support 11 are required to be correctly controlled. For example, if transfer is performed at 300 dpi (dots per inch) for each line, the feed amount is required to be maintained at 84 µm. In this case, the feed amount may be 42 µm, which is half of 84 µm, to improve image quality. Therefore, the platen roller 314 is generally driven by a motor. To maintain a constant feed amount, it is desirable that friction between the support 11 and the platen roller 314 is high. For this purpose, a urethane-based material is preferred to be used for the platen roller 314.

It is preferred that an abrasion-resistant material is used for the surface of the platen roller 314. The surface of the platen roller 314 is required to have high shape accuracy. Thus, usually, the surface of the platen roller 314 is subjected to precision polishing. Therefore, if an easy-to-wear material is used for the surface of the platen roller 314, the surface may be roughened due to polishing and asperities may be produced on the surface. Such asperities may lead to not only unstable transfer but also reduction in contact area with the support 11. Consequently, friction between the support 11 and the platen roller 314 may be reduced.

As mentioned above, the surface of the platen roller 314 has high shape accuracy. Also, the surface of the thermal head 312 facing the platen roller 314 has high shape accuracy. The transfer foil 2 and the support 11 are sandwiched between the thermal head 312 and the platen roller 314 and thermally pressed in this state. Consequently, the adhesive layer 224 is fused so that the transfer foil 2 and the support 11 are adhered to each other.

The release plate 315, together with the guide rollers 316*b* and 316*c*, branches off the conveying direction of the support 11 from that of the transfer foil 2. Thus, the support 11 and the transfer foil 2 are separated from each other. The support 11 and the transfer foil can be separated from each other with minimum force if the conveying direction of the support 11 is substantially perpendicular to the conveying direction of the transfer foil 2.

After the transfer foil 2 and the support 11 have passed between the thermal head 312 and the platen roller 314, the temperature of the thermally pressed portions of the transfer layer 22 lowers, and the adhesion of these portions with the support 11 is enhanced accordingly even more than the adhesion thereof with the substrate 21. Then, when the support 11 and the transfer foil 2 are separated from each other, the thermally pressed portions of the transfer layer 22 are separated from the substrate 21, maintaining adhesion with the support 11. Portions of the transfer foil 22 which have not been thermally pressed are separated from the support 11, maintaining adhesion with the substrate 21. In this way, the image I1 shown in FIG. 1 is recorded on the support 11.

The computer 32 shown in FIG. 6 may be connected to the transfer device 31 in a wired or wireless manner.

As shown in FIG. 7, the computer 32 includes a hardware device 321, an input device 322 and an output device 323.

Figure 8:
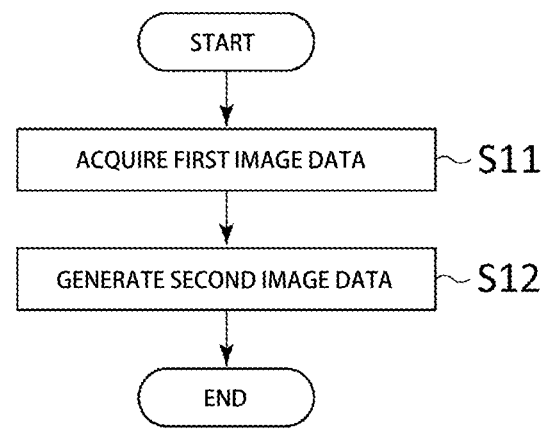
FIG. 8 is a flowchart illustrating a method of generating image data according to an embodiment of the present invention.
Figure 9:
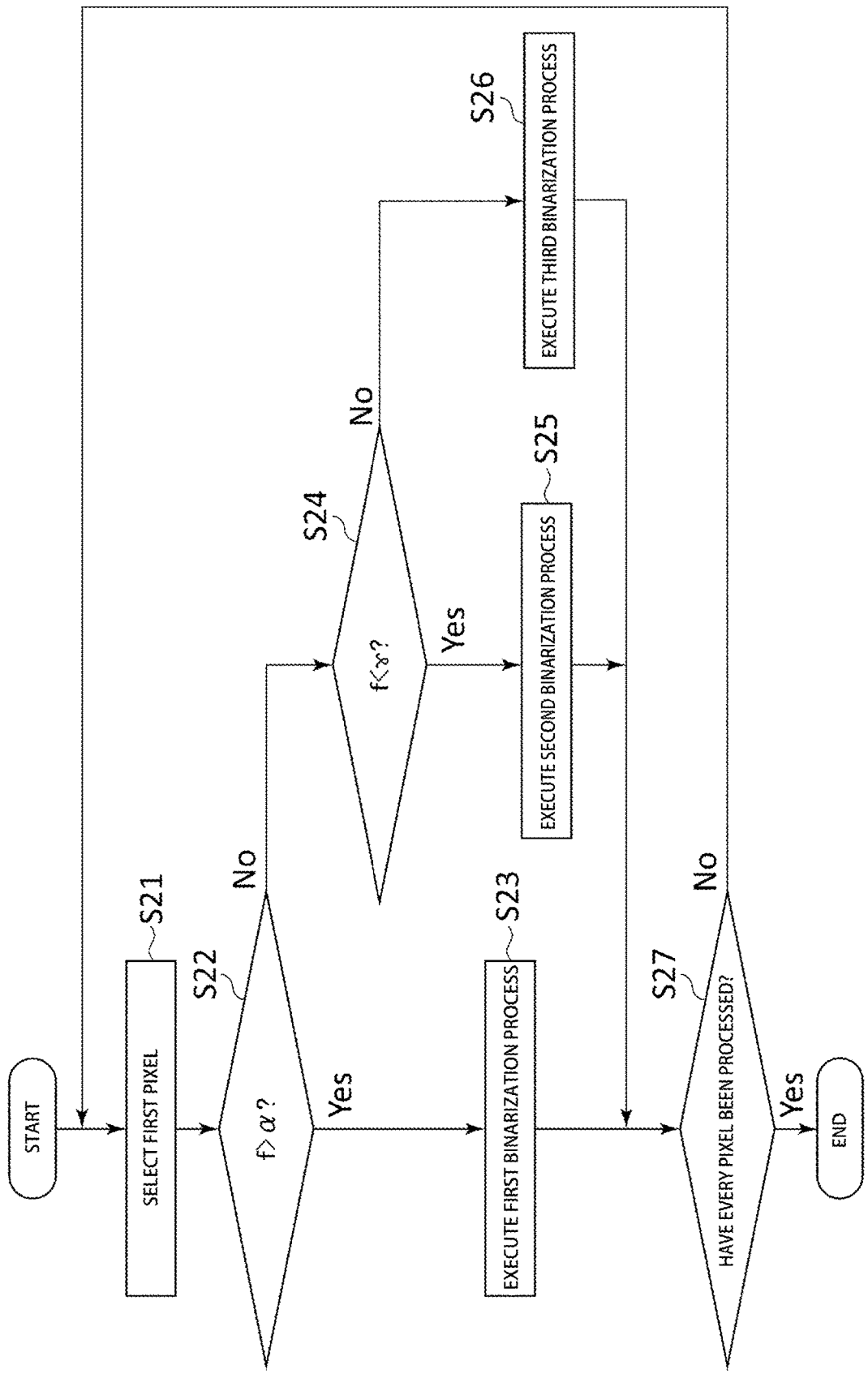
FIG. 9 is a flowchart illustrating a method of generating second image data based on first image data according to an embodiment of the present invention.
Figure 12:
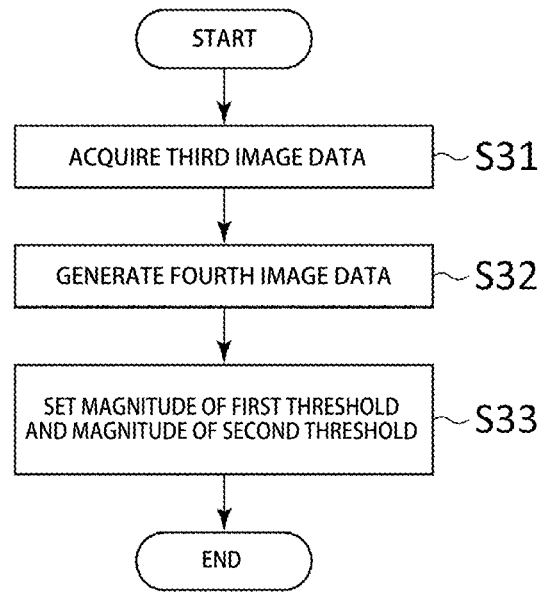
FIG. 12 is a flowchart illustrating a method of setting the magnitude of a first threshold and the magnitude of a second threshold according to an embodiment of the present invention.

The hardware device 321 includes a central processing unit (CPU) 3211, a main storage 3212, and an auxiliary storage 3213. The hardware device 321 is a device into which programs for causing the hardware device 321 to execute steps described below with reference to FIGS. 8, 9, and 12 are read. The programs may be stored in advance in the hardware device 321. Instead of this, the programs may be recorded in the form of a computer-readable storage medium and then distributed. Later, the programs may be stored in the hardware device 321.

The central processing unit 3211 performs arithmetic processing, such as conversion of image data, or exercises overall control according to predetermined programs.

The main storage 3212 includes a random access memory (RAM). Data and programs are read into the main storage 3212. These programs include programs for causing the computer 32 to execute the steps described with reference to FIGS. 8, 9, and 12.

For example, the auxiliary storage 3213 may be a hard disc drive (HDD) or a solid state drive (SSD). For example, the auxiliary storage 3213 may store some of the programs and data read into the main storage 3212. The auxiliary storage 3213 may further include a device to which a removable medium can be connected or installed, e.g., a card reader to which a memory card can be connected, or a disc drive to which an optical disc or a magnetic disc can be installed. The programs and data may be recorded on these recording media.

For example, the input device 322 may include a keyboard and a mouse. The input device 322 may further include another device, e.g., a digital camera. The input device 322 includes an interface that is connectable to other devices in a wired or wireless manner. The input device 322 includes an interface that is connectable to memory media.

The output device 323 may include a display, for example. The transfer device 31 shown in FIG. 6 is connected to the hardware device 321 as another output device.

For example, the display 1 may be produced using the production system 3 through the method described below.

First, the hardware device 321 obtains second image data using a method of generating image data described later, based on first image data that is the original image data. Specifically, the original image is a raster image which is a color image expressed in two or more colors, and more preferably in three or more colors.

The first image data is color image data expressed in two or more colors, where each of the pixels has a tone value for each of the colors. The first image data is digital data including information that relates to the positions of the pixels and the tone values of each of the colors in each of the pixels. In the first image data, each of the pixels has any of different tone values in three or more levels. The greater the tone value, the brighter the color. Here, as an example, in the first image data, each of the pixels has any of tone values in 256 levels from 0 to 255 for each of red, green, and blue colors. Herein, the pixels are arranged in a matrix, i.e., arranged in two directions intersecting each other.

The first image data is image data obtained by, for example, capturing an image of a person by a digital camera. The first image data may be image data that is acquired by reading an image using a scanner. The hardware device 321 imports the first image data through the input device 322. The main storage 3212 temporarily stores the first image data. The central processing unit 3211 may save the first image data in the auxiliary storage 3213.

The second image data is color image data expressed in two or more colors, where each of the pixels has a binarized tone value for each of the colors. The second image data is digital data including information that relates to the positions of the pixels and the tone values of each of the colors in each of the pixels. In the second image data, each of the pixels has any of tone values in two levels for each of red, green, and blue colors. Here, as an example, in the first image data, each of the pixels has any of tone values in either one of two levels, 0 or 255, for each of red, green, and blue colors. Herein, the pixels are arranged in a matrix, i.e., arranged in two directions intersecting each other.

Then, the hardware device 321 receives an instruction or the like input from the operator through the input device 322. When the instruction or the like is input to the hardware device 321, the main storage 3212 reads the programs or data from the auxiliary storage 3213. The central processing unit 3211 performs arithmetic processing, such as conversion of data, according to the programs. Specifically, the hardware device 321 generates the second image data based on the first image data, and converts the generated second image data into a form suitable for the transfer device 31. Furthermore, the hardware device 321 generates a signal to be supplied to the display so that the operator can confirm that the processing is correctly performed, via the image displayed on the display.

After that, based on the second image data, the transfer device 31 shown in FIG. 6 transfers two or more types of display elements that each include diffractive structures and display different colors, onto the support 11. Each pixel in the second image data corresponds to a corresponding pixel PX in the display 1 shown in FIG. 2. Thus, the transfer device 31 records the image I1 corresponding to the second image data on the support 11.

As described above, the thermal head 312 heats the transfer foil 2, for example, for each line. Accordingly, the hardware device 321 converts the second image data to a collection of line data and sequentially supplies the line data to the transfer device 31. In place of adopting a configuration in which the hardware device 321 performs conversion to line data, the transfer device 31 may be provided with a dedicated board for performing conversion to line data.

Next, a method of generating image data will be described.

FIG. 8 is a flowchart illustrating a method of generating image data.

The hardware device 321 executes a process for the method of generating image data illustrated in FIG. 8, for example, based on the instruction input by the operator with the input device 322.

The hardware device 321 acquires the first image data (step S11). In step S11, the hardware device 321 acquires the first image data through the input device 322, for example.

The hardware device 321 generates the second image data based on the first image data (step S12). A specific example of step S12 will be described later.

FIG. 9 is a flowchart showing a method of generating second image data, based on the first image data at step S12 shown in FIG. 8. Step S12 includes all or some of the steps shown in FIG. 9.

The hardware device 321 selects a first pixel from among a plurality of pixels constituting the first image data (step S21). The first pixel is a pixel that is a target for a binarization process. The hardware device 321 executes a binarization process on all the plurality of pixels constituting the first image data one by one. Thus, in step S21, the hardware device 321 selects the first pixels one by one from among the plurality of pixels constituting the first image data.

For example, the hardware device 321 selects the first pixels one by one in the horizontal direction from each of the upper line to lower line of the first image data. The horizontal direction is, for example, from the left end to the right end. Accordingly, the hardware device 321 selects the first pixels one by one from the upper left pixel to the lower right pixel of the plurality of pixels constituting the first image data.

The hardware device 321 compares a tone value f of the first pixel with at least either of a first threshold α and a second threshold γ as exemplified below. The tone value f is any of tone values in three or more levels. Here, as an example, the tone value f is any of tone values in 256 levels.

The hardware device 321 compares the tone value f of the first pixel with the first threshold α (step S22). At step S22, the hardware device 321 compares the tone value f of each color for the first pixel with the first threshold α for the corresponding color. The first thresholds α are any tone values in 256 levels. The magnitudes of the first thresholds α for the each color may be the same as or different from each other. Setting examples of the magnitudes of the first thresholds α for the each color will be described later.

In response to the comparison result showing that the tone value f of the first pixel is greater than the first threshold α (Yes at step S22), the hardware device 321 binarizes the tone value f of the first pixel using a first binarization process (step S23).

In step S23, in response to the comparison result showing that the tone value f of red of the first pixel is greater than the first threshold α for red, the hardware device 321 binarizes the tone value f of red of the first pixel using the first binarization process. Similarly, in response to the comparison result showing that the tone value f of green of the first pixel is greater than the first threshold α for green, the hardware device 321 binarizes the tone value f of green of the first pixel using the first binarization process. Similarly, in response to the comparison result showing that the tone value f of blue of the first pixel is greater than the first threshold α for blue, the hardware device 321 binarizes the tone value f of blue of the first pixel using the first binarization process. An example of the first binarization process will be described later.

In response to the comparison result showing that the tone value f of the first pixel is equal to or less than the first threshold α (No at step S22), the hardware device 321 binarizes the tone value f of the first pixel with the second threshold γ (step S24). In step S24, in response to the comparison result showing that the tone value f of red of the first pixel is equal to or less than the first threshold α for red, the hardware device 321 compares the tone value f of red of the first pixel with the second threshold γ for red. Similarly, in response to the comparison result showing that the tone value f of green of the first pixel is equal to or less than the first threshold α for green, the hardware device 321 compares the tone value f of green of the first pixel with the second threshold γ for green. Similarly, in response to the comparison result showing that the tone value f of blue of the first pixel is equal to or less than the first threshold α for blue, the hardware device 321 compares the tone value f of blue of the first pixel with the second threshold γ for blue.

The second thresholds γ for the each color are smaller than the corresponding first thresholds α for the each color. The second thresholds γ for each color are any tone values in 256 levels. The magnitudes of the second thresholds γ for each color may be the same as or different from each other. Setting examples of the magnitudes of the second thresholds γ for each color will be described later.

In response to the comparison result showing that the tone value f of the first pixel is smaller than the second threshold γ (Yes at step S24), the hardware device 321 binarizes the tone value f of the first pixel using a second binarization process (step S25).

In step S25, in response to the comparison result showing that the tone value f of red of the first pixel is greater than the second threshold γ for red, the hardware device 321 binarizes the tone value f of red of the first pixel using the second binarization process. Similarly, in response to the comparison result showing that the tone value f of green of the first pixel is greater than the second threshold γ for green, the hardware device 321 binarizes the tone value f of green of the first pixel using the second binarization process. Similarly, in response to the comparison result showing that the tone value f of blue of the first pixel is greater than the second threshold γ for blue, the hardware device 321 binarizes the tone value f of blue of the first pixel using the second binarization process.

The second binarization process is different from the first binarization process. An example of the second binarization process will be described later.

In response to the comparison result showing that the tone value f of the first pixel is equal to or less than the first threshold α and is equal to or greater than the second threshold γ (No at step S24), the hardware device 321 binarizes the tone value f of the first pixel using a third binarization process (step S26).

In step S26, in response to the comparison result showing that the tone value f of red of the first pixel is equal to or less than the first threshold α for red and is equal to or greater than the second threshold γ for red, the hardware device 321 binarizes the tone value f of red of the first pixel using the third binarization process. Similarly, in response to the comparison result showing that the tone value f of green of the first pixel is equal to or less than the first threshold α for green and is equal to or greater than the second threshold γ for green, the hardware device 321 binarizes the tone value f of green of the first pixel using the third binarization process. Similarly, in response to the comparison result showing that the tone value f of blue of the first pixel is equal to or less than the first threshold α for blue and is equal to or greater than the second threshold γ for blue, the hardware device 321 binarizes the tone value f of blue of the first pixel using the third binarization process.

The third binarization process is different from the first binarization process and the second binarization process. An example of the third binarization process will be described later.

The hardware device 321 determines whether the binarization process has been completed on all the pixels constituting the first image data (step S27). In response to the determination result showing that the binarization process has been completed on all the pixels constituting the first image data (Yes at step S27), the process is terminated. Accordingly, the hardware device 321 completes the generation of the second image data.

In response to the determination result showing that the binarization process has not yet been completed on all the pixels constituting the first image data (No at step S27), step S21 is cyclically executed.

The hardware device 321 may exchange the order of steps S22 and S24.

As described above, the hardware device 321 can reduce an imbalance in the amount of information among the positions on the image, by binarization processes different from the common error diffusion method. Thus, the hardware device 321 can improve the reproducibility of the original image in the image I1 which is based on the second image data.

Next, an example of the first binarization process will be described.

The first binarization process includes setting the tone value of the first pixel to a first tone value that is greater than the first threshold α. For example, the hardware device 321 sets the tone value of the first pixel to 255 using the first binarization process. The tone value of 255 is an example of the first tone value. The hardware device 321 sets the tone value of red of the first pixel to 255. Similarly, the hardware device 321 sets the tone value of green of the first pixel to 255. Similarly, the hardware device 321 sets the tone value of blue of the first pixel to 255.

Next, an example of the second binarization process will be described.

Figure 10:
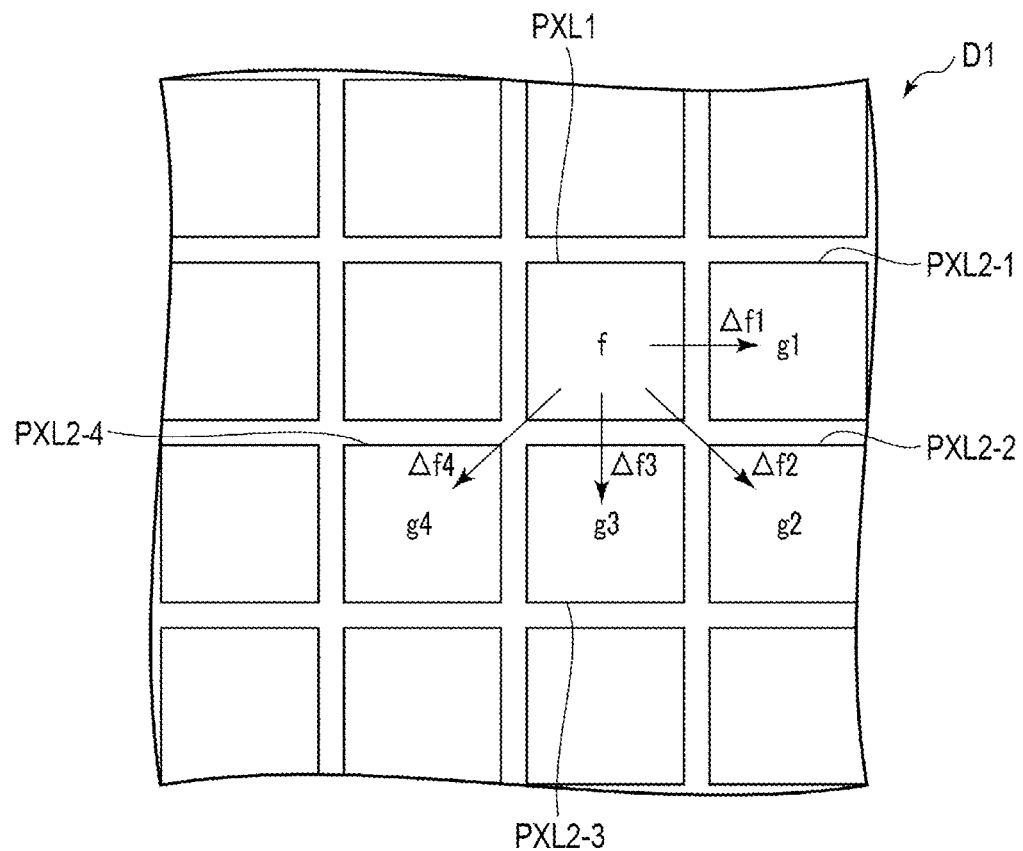
FIG. 10 is a diagram illustrating an example of a second binarization process according to an embodiment of the present invention.

FIG. 10 is a diagram showing an example of the second binarization process.

FIG. 10 shows a part of first image data D1. A pixel PXL 1 is the first pixel. Here, the second binarization process for one of red, green, and blue colors will be described. However, the second binarization process is performed in the same manner for all the colors.

The second binarization process includes setting the tone value f of the first pixel to a second tone value that is smaller than the second threshold γ. In an example, the hardware device 321 sets the tone value of the pixel PXL 1 to 0 using the second binarization process. The tone value of 0 is an example of the second tone value.

The second binarization process includes selecting the second pixel. The second pixel is one or more pixels different from the first pixel and is one or more pixels other than pixels out of the plurality of pixels constituting the first image data D1 that have been binarized by setting the first tone value or the second tone value. In a typical example, the second pixel is one or more pixels other than pixels binarized by setting the first tone value or the second tone value, and is adjacent to the first pixel. In this example, the hardware device 321 selects, as the second pixels, four pixels PXL 2-1, PXL 2-2, PXL 2-3, and PXL 2-4 other than binarized pixels out of the eight pixels surrounding the pixel PXL 1 as shown in FIG. 10. The number and positions of the second pixels are not limited to those in the example shown in FIG. 10.

The second binarization process includes distributing the value corresponding to the tone value f of the first pixel (for example, the value corresponding to any of tone values in 256 levels) to the second pixels. For example, the hardware device 321 distributes the value obtained by the product of the value corresponding to the tone value f of the pixel PXL 1 and each weight coefficient, to the pixels PXL 2-1, PXL 2-2, PXL 2-3, and PXL 2-4.

The hardware device 321 adds a value $\Delta f1$ obtained by the production of the value corresponding to the tone value f of the pixel PXL 1 and a predetermined weight coefficient i1 to a tone value g1 of the pixel PXL 2-1. Here, as an example, the tone value g1 is any of tone values in 256 levels. Thus, a tone value g1' of the pixel PXL 2-1 after the second binarization process is a value obtained by adding $\Delta f1$ to the tone value g1. The hardware device 321 adds a value $\Delta f2$ obtained by the product of the value corresponding to the tone value f of the pixel PXL 1 and a predetermined weight coefficient i2 to a tone value g2 of the pixel PXL 2-2. Here, as an example, the tone value g2 is any of tone values in 256 levels. Thus, a tone value g2' of the pixel PXL 2-2 after the second binarization process is a value obtained by adding $\Delta f2$ to the tone value g2. The hardware device 321 adds a value $\Delta f3$ obtained by the product of the value corresponding to the tone value f of the pixel PXL 1 and a predetermined weight coefficient i3 to a tone value g3 of the pixel PXL 2-3. Here, as an example, the tone value g3 is any of tone values in 256 levels. Thus, a tone value g3' of the pixel PXL 2-3 after the second binarization process is a value obtained by adding $\Delta f3$ to the tone value g3. The hardware device 321 adds a value $\Delta f4$ obtained by the production of the value corresponding to the tone value f of the pixel PXL 1 and a predetermined weight coefficient i4 to a tone value g4 of the pixel PXL 2-4. Here, as an example, the tone value g4 is any of tone values in 256 levels. Thus, a tone value g4' of the pixel PXL 2-4 after the second binarization process is a value obtained by adding $\Delta f4$ to the tone value g4.

The sum of the weight coefficients i1, i2, i3, and i4 is 1. According to the Floyd-Steinberg method, the weight coefficient it is 7/16, the weight coefficient i2 is 3/16, the weight coefficient i3 is 5/16, and the weight coefficient i4 is 1/16. Thus, the sum of $\Delta f1$, $\Delta f2$, $\Delta f3$, and $\Delta f4$ is equal to the value corresponding to the tone value f of the pixel PXL 1.

Next, an example of the third binarization process will be described.

Figure 11:
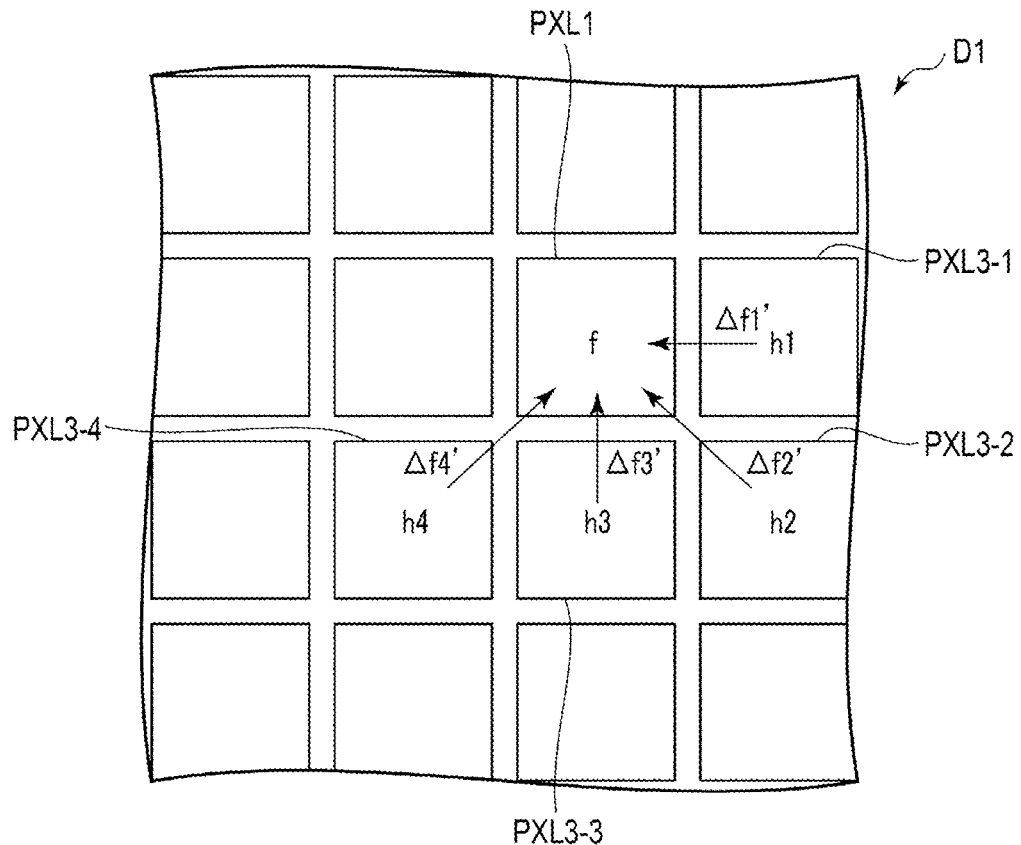
FIG. 11 is a diagram illustrating an example of a third binarization process according to an embodiment of the present invention.

FIG. 11 is a diagram showing an example of the third binarization process.

FIG. 11 shows a part of the first image data D1. A pixel PXL 1 is the first pixel. Here, the third binarization process for one of red, green, and blue colors will be described. However, the third binarization process is performed in the same manner for every color.

The third binarization process includes selecting the third pixel. The third pixel is one or more pixels different from the first pixel and is one or more pixels other than pixels out of the plurality of pixels constituting the first image data D1 that have been binarized by setting the first tone value or the second tone value. In a typical example, the third pixel is one or more pixels other than pixels binarized by setting the first tone value or the second tone value, and is adjacent to the first pixel. In this example, the hardware device 321 selects, as the third pixels, four pixels PXL 3-1, PXL 3-2, PXL 3-3, and PXL 3-4 other than binarized pixels out of the eight pixels surrounding the pixel PXL 1 as shown in FIG. 11. The number and positions of the third pixels are not limited to those in the example shown in FIG. 11. The third pixels may be the same as or different from the second pixels.

The third binarization process includes executing an adjustment process of subtracting a predetermined value from the tone value of the third pixel and adding the predetermined value to the tone value f of the first pixel. For example, the hardware device 321 subtracts a predetermined value $\Delta f1'$ from a tone value h1 of the pixel PXL 3-1 and adds the predetermined value $\Delta f1'$ to the tone value f of the pixel PXL 1. Here, as an example, the tone value h1 is any of tone values in 256 levels. A tone value h1' of the pixel PXL 3-1 after the adjustment process is a value obtained by subtracting $\Delta f1'$ from the tone value h1.

Along with this, the hardware device 321 subtracts a predetermined value $\Delta f2'$ from a tone value h2 of the pixel PXL 3-2 and adds the predetermined value $\Delta f2'$ to the tone value f of the pixel PXL 1. Here, as an example, the tone value h2 is any of tone values in 256 levels. A tone value h2' of the pixel PXL 3-2 after the adjustment process is a value obtained by subtracting $\Delta f2'$ from the tone value h2.

Along with this, the hardware device 321 subtracts a predetermined value $\Delta f3'$ from a tone value h3 of the pixel PXL 3-3 and adds the predetermined value $\Delta f3'$ to the tone value f of the first pixel PXL 1. Here, as an example, the tone value h3 is any of tone values in 256 levels. A tone value h3' of the pixel PXL 3-3 after the adjustment process is a value obtained by subtracting $\Delta f3'$ from the tone value h3.

Along with this, the hardware device 321 subtracts a predetermined value $\Delta f4'$ from a tone value h4 of the pixel PXL 3-4 and adds the predetermined value $\Delta f4'$ to the tone value f of the pixel PXL 1. Here, as an example, the tone value h4 is any of tone values in 256 levels. A tone value h4' of the pixel PXL 3-4 after the adjustment process is a value obtained by subtracting $\Delta f4'$ from the tone value h4.

Thus, a tone value f' of the first pixel after the adjustment process is a value obtained by adding the predetermined values $\Delta f1'$, $\Delta f2'$, $\Delta f3'$, and $\Delta f4'$ to the tone value f.

The predetermined value is 0 when the tone value of the third pixel is equal to or less than the first threshold $\alpha$. On the other hand, when the tone value of the third pixel is greater than the first threshold $\alpha$, the predetermined value is a positive value that is smaller than a value obtained by subtracting the first threshold $\alpha$ from the tone value of the third pixel.

In an example, $\Delta f1'$ is 0 when the tone value h1 of the pixel PXL 3-1 is equal to or less than the first threshold $\alpha$. When the tone value h1 is greater than the first threshold $\alpha$, $\Delta f1'$ takes on a positive value that is smaller than a value obtained by subtracting the first threshold $\alpha$ from the tone value h1. In a typical example, $\Delta f1'$ takes on a value obtained by the product of the value obtained by subtracting the first threshold $\alpha$ from the tone value h1 and the predetermined weight coefficient k1.

$\Delta f2'$ is 0 when the tone value h2 of the pixel PXL 3-2 is equal to or less than the first threshold $\alpha$. When the tone value h2 is greater than $\alpha$, $\Delta f2'$ takes on a positive value that is smaller than a value obtained by subtracting the first threshold $\alpha$ from the tone value h2. In a typical example, $\Delta f2'$ is obtained by the product of the value obtained by subtracting the first threshold $\alpha$ from the tone value g2 and the predetermined weight coefficient k2.

$\Delta f3'$ is 0 when the tone value h3 of the pixel PXL 3-3 is equal to or less than the first threshold $\alpha$. When the tone value h3 is greater than the first threshold $\alpha$, $\Delta f3'$ is a positive value that is smaller than a value obtained by subtracting the first threshold $\alpha$ from the tone value g3. In a typical example, $\Delta f3'$ is a value obtained by the product of the value obtained by subtracting the first threshold $\alpha$ from the tone value h3 and the predetermined weight coefficient k3.

$\Delta f4'$ is 0 when the tone value h4 of the pixel PXL 3-4 is equal to or less than the first threshold $\alpha$. When the tone value h4 is greater than the first threshold $\alpha$, $\Delta f4'$ takes on a positive value that is smaller than a value obtained by subtracting the first threshold $\alpha$ from the tone value h4. In a typical example, $\Delta f4'$ is a value obtained by the product of the value obtained by subtracting the first threshold $\alpha$ from the tone value h4 and the predetermined weight coefficient k4.

The sum of the weight coefficients k1, k2, k3, and k4 is 1. The weight coefficients k1, k2, k3, and k4 may be equal to or different from the respective weight coefficients i1, i2, i3, and i4.

As described above, when the pixel value of the third pixel before the adjustment process is greater than the first threshold $\alpha$, the pixel value of the third pixel after the adjustment process does not become equal to or less than the first threshold $\alpha$. Thus, the pixels having tone values greater than the first threshold $\alpha$ will not be set to the second tone value by the adjustment process. This improves the reproducibility of the original image in the image I1 which is based on the second image data.

The third binarization process includes comparing the tone value f' of the first pixel after the adjustment process with the first threshold $\alpha$. For example, the hardware device 321 compares the tone value f' of the pixel PXL 1 with the first threshold $\alpha$.

The third binarization process includes setting the tone value of the first pixel to the first tone value, in response to the comparison result showing that the tone value f' of the first pixel after the adjustment process is more than the first threshold $\alpha$. For example, the hardware device 321 sets the tone value of the pixel PXL 1 to the tone value of 255 that is an example of the first tone value, in response to the comparison result showing that the tone value f' of the PXL 1 is more than a. The third binarization process includes setting the tone value of the first pixel to the second tone value, in response to the comparison result showing that the tone value f' of the first pixel after the adjustment process is equal to or less than the first threshold $\alpha$. For example, the hardware device 321 sets the tone value of the pixel PXL 1 to the tone value of 0 that is an example of the second tone value, in response to the comparison result showing that the tone value f' of the pixel PXL 1 is equal to or less than the first threshold $\alpha$.

As described above, by using the three binarization processes having different characteristics from each other, the hardware device 321 can reduce an imbalance in the amount of information among the positions on the image. This improves the reproducibility of the original image in the image I1 which is based on the second image data.

Next, examples of setting the magnitudes of the first thresholds α for the each color and examples of setting the magnitudes of the second thresholds γ for the each color will be described.

Before generation of the second image data, the hardware device 321 sets the magnitudes of the first thresholds α and the magnitudes of the second thresholds γ for the each color, which will be used in the generation of the second image data. For example, for each piece of first image data, the hardware device 321 sets the magnitudes of the first thresholds α and the magnitudes of the second thresholds γ for each color in sequence based on the first image data.

The reproducibility of the original image in the image I1 which is based on the second image data greatly varies depending on the magnitudes of the first thresholds α and the magnitudes of the second thresholds γ. The hardware device 321 can improve the reproducibility of the original image in the image I1 which is based on the second image data by setting the magnitudes of the first thresholds α and the magnitudes of the second thresholds γ suited for each first image data.

FIG. 12 is a flowchart showing a method of setting the magnitudes of the first thresholds α and the magnitudes of the second thresholds γ. Setting the magnitudes of the first thresholds α and the magnitudes of the second thresholds γ to be used for generation of the second image data includes all or some of the steps shown in FIG. 12.

The hardware device 321 acquires third image data corresponding to a part of the first image data (step S31). In step S31, the hardware device 321 acquires the data of a part designated by the operator for improving the reproducibility of the original image, as third image data.

When the first image data includes the data of a facial image, the hardware device 321 preferably acquires the third image data including at least part of the data of the face image. In this case, the hardware device 321 determines a center of the face in the first image data by a face detection algorithm. The center of the face is generally near the nose. The hardware device 321 refers to the center position of the face and identify the eyes and the mouth which are near the center of the face. The hardware device 321 can identify the eyes and the mouth by, for example, detecting a whitish parts of the eyes and a reddish part of the mouth near the center of the face. Accordingly, the hardware device 321 can acquire the third image data including at least part of the data of the face image.

The hardware device 321 generates fourth image data based on the third image data (step S32). At step S32, for the each color, the hardware device 321 binarizes the tone value of each pixel constituting the third image data by any of the first binarization process, the second binarization process, and the third binarization process, with each combination of the magnitude of the first threshold α and the magnitude of the second threshold γ, thereby to generate the fourth image data. Thus, the fourth image data has the binarized tone value for each pixel. The fourth image data is generated in accordance with the combinations of the magnitudes of the first thresholds α and the magnitudes of the second thresholds γ.

In an example, first, the hardware device 321 sets the second threshold γ to 0. Next, the hardware device 321 changes the magnitude of the first threshold α and binarizes the third image data for each magnitude of the first threshold α by an arbitrary common error diffusion method, thereby to generate fifth image data that has the binarized tone value of each pixel. Then, the hardware device 321 calculates the total value based on the differences in pixels between the fifth image data and the third image data, for each magnitude of the first threshold α. The total value based on the differences in pixels is, for example, a square sum of the differences in pixels. Next, the hardware device 321 extracts the magnitude of the first threshold α with which the total value of the differences in pixel between the fifth image data and the third image data is minimized. Then, the hardware device 321 changes the magnitude of the second threshold γ while changing the magnitude of the first threshold α in the vicinity of the extracted magnitude of the first threshold α, and generates the fourth image data based on the third image data, for each combination of the magnitude of the first threshold α and the magnitude of the second threshold γ. The hardware device 321 may fix the extracted magnitude of the first threshold α, change the magnitude of the second threshold γ, and generate the fourth image data based on the third image data, for each combination of the magnitude of the first threshold α and the magnitude of the second threshold γ.

The hardware device 321 calculates, for the each color, the sum of the differences in pixel between the fourth image data and the third image data with each combination of the magnitude of the first threshold α and the magnitude of the second threshold γ. The total value based on the differences in pixels is, for example, a square sum of the differences in pixels.

The hardware device 321 sets the magnitude of the first threshold α and the magnitude of the second threshold γ to be used for generation of the second image data, based on the combination of the magnitude of the first threshold α and the magnitude of the second threshold γ with which the total value of the differences in pixel between the fourth image data and the third image data becomes the smallest. Thus, the hardware device 321 sets the magnitudes of the first thresholds α and the magnitudes of the second thresholds γ for each color.

The hardware device 321 executes many repetitive arithmetic operations in order to determine the appropriate magnitudes of the first thresholds α and the second thresholds γ. The hardware device 321 can extract third image data corresponding to part of the first image data to decrease the number of the repetitive arithmetic operations, thereby shortening the time required for determining the appropriate magnitudes of the first thresholds α and the second thresholds γ. As a result, the hardware device 321 can reduce imbalance in the amount of information among the positions on the image, by the combination of the appropriate magnitudes of the first thresholds α and the second thresholds γ.

The hardware device 321 can further acquire the third image data including at least part of the data of the facial image to determine the appropriate magnitudes of the first thresholds a and the second thresholds γ, thereby improving the reproducibility of the original image.

Example

Example of the present invention will be described below. Here, a description will be given of an example of setting the magnitude of the first threshold α and the magnitude of the second threshold γ in accordance with the setting method described above with respect to FIG. 12.

Figure 13:
FIG. 13 is a diagram illustrating image data used in an example.

FIG. 13 illustrates the image data used in the example.

Here, as first image data that is the original image data, the image data shown in FIG. 13 was used. The image data shown in FIG. 13 is raster data in which the number of tone values was 256 for each of red, green, and blue.

The hardware device 321 acquired third image data of areas including the eyes and the mouth corresponding to part of the image data shown in FIG. 13. The hardware device 321 set the second threshold γ to 0. The hardware device 321 changed the magnitude of the first threshold α and binarized the third image data, to thereby generate fifth image data having the binarized tone value for each pixel. The hardware device 321 changed the magnitude of the first threshold α at intervals. The hardware device 321 used the Floyd-Steinberg method. The hardware device 321 calculated the sum of squares of differences in pixel between the fifth image data and the third image data for each magnitude of the first threshold α. Hereinafter, the sum of squares of differences in pixel is referred to as summed difference.

FIG. 14 is a table that shows the relationship among the summed differences between the fifth image data and the third image data for each magnitude of the first threshold α.

Figures 15, 16:
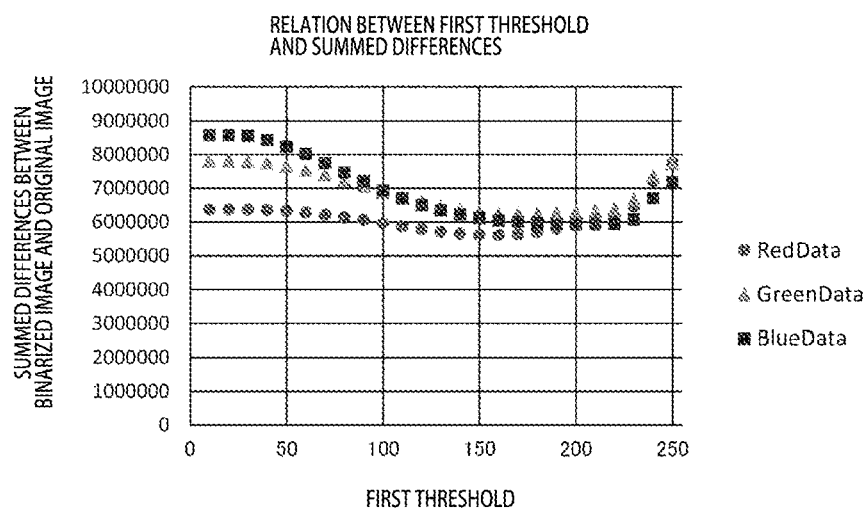
FIG. 15 is a graph indicating the relationship of summed differences between the binarized image and the original image with each magnitude of the first threshold in the example.
FIG. 16 is a table indicating a relationship of summed differences between the binarized image and the original image with each magnitude of the second threshold in the example.

FIG. 15 is a graph that shows the relationship among the summed differences between the fifth image data and the third image data for each magnitude of the first threshold α.

FIGS. 14 and 15 show that the summed differences between the fifth image data and the third image data vary depending on the magnitude of the first threshold α in each of red, green, and blue.

As the magnitude of the first threshold α for red, the hardware device 321 extracted 160 in which the summed difference between the fifth image data and the third image data for each pixel becomes the smallest. As the magnitude of the first threshold α for green, the hardware device 321 extracted 170 in which the summed difference between the fifth image data and the third image data for each pixel becomes the smallest. As the magnitude of the first threshold α for blue, the hardware device 321 extracted 210 in which the summed difference between the fifth image data and the third image data for each pixel becomes the smallest.

The hardware device 321 fixed the extracted magnitudes of the first threshold α and changed the magnitude of the second threshold γ. The hardware device 321 changes the magnitude of the second threshold γ at intervals of 10. The hardware device 321 binarizes the tone value for each pixel constituting the third image data by any of the first binarization process, the second binarization process, and the third binarization process, to thereby generate the fourth image data.

FIG. 16 is a table that shows the relationship among the summed differences between the second image data and the fourth image data for each magnitude of the second threshold α.

Figure 17:
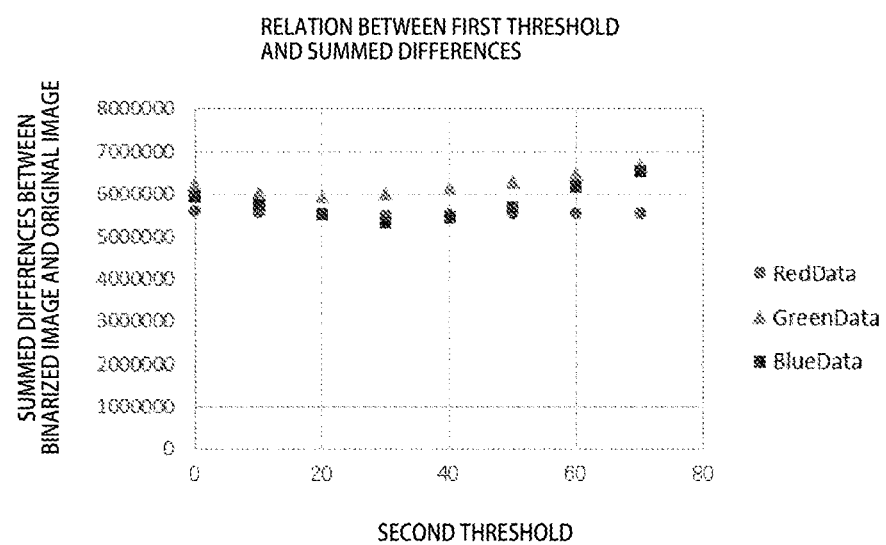
FIG. 17 is a graph indicating the relationship of summed differences between the binarized image and the original image with each magnitude of the second threshold in the example.

FIG. 17 is a graph that shows the relationship among the summed differences between the fourth image data and the third image data for each magnitude of the second threshold γ.

FIGS. 16 and 17 show that the summed differences between the fourth image data and the third image data vary depending on the magnitude of the second threshold γ in each of red, green, and blue.

As the magnitude of the second threshold α for red, the hardware device 321 extracted 30 in which the summed difference between the fourth image data and the third image data for each pixel becomes the smallest. As the magnitude of the second threshold α for green, the hardware device 321 extracted 20 in which the summed difference between the fourth image data and the third image data for each pixel becomes the smallest. As the magnitude of the second threshold α for green, the hardware device 321 extracted 30 in which the summed difference between the fourth image data and the third image data for each pixel becomes the smallest.

For red, the hardware device 321 set the magnitude of the first threshold α to 160 and the magnitude of the second threshold γ to 30. For green, the hardware device 321 set the magnitude of the first threshold α to 170 and the magnitude of the second threshold γ to 20. For blue, the hardware device 321 set the magnitude of the first threshold α to 210 and the magnitude of the second threshold γ to 30.

The total difference is an index of the reproducibility of the original image. If the summed difference is small, the reproducibility of the original image is high. As is shown in the present example, the summed difference can be reduced by appropriately setting the magnitude of the first threshold α and the magnitude of the second threshold γ. This improves the reproducibility of the original image.

REFERENCE SIGNS LIST

1 . . . Display; 2 . . . Transfer foil; 3 . . . Production system; 11 . . . Support; 12B . . . Display element; 12G . . . Display element; 12R . . . Display element; 13 . . . Resin layer; 14 . . . Protective layer; 21 . . . Substrate; 22 . . . Transfer layer; 23 . . . Back coat layer; 31 . . . Transfer device; 32 . . . Computer; 122 . . . Relief structure forming layer; 123 . . . Reflective layer; 124 . . . Adhesive layer; 125 . . . Protective layer; 222 . . . Relief structure forming layer; 223 . . . Reflective layer; 224 . . . Adhesive layer; 225 . . . Protective layer; 311 . . . Unwinding part; 312 . . . Thermal head; 313 . . . Take-up part; 314 . . . Platen roller; 315 . . . Release layer; 316a . . . Guide roller; 316b . . . Guide roller; 316c . . . Guide roller; 321 . . . Hardware device; 322 . . . Input device; 323 . . . Output device; 3211 . . . Central processing unit; 3212 . . . Main storage; 3213 . . . Auxiliary storage; D1 . . . First image data; DG . . . Diffractive structure; I1 . . . Image; I2 . . . Image; I3 . . . Image; PX Pixel; PXL 1 . . . Pixel; PXL 2-1 . . . Pixel; PXL 2-2 . . . Pixel; PXL 2-3 . . . Pixel; PXL 2-4 . . . Pixel; PXL 3-1 . . . Pixel; PXL 3-2 . . . Pixel; PXL 3-3 . . . Pixel; PXL 3-4 . . . Pixel.

What is claimed is:
1. A method of generating image data, comprising:
acquiring first image data represented in two or more colors, the first image data comprises a plurality of pixels, wherein said acquiring comprises acquiring for each pixel of the plurality of pixels of the first image data, a tone value for each of the two or more colors; and
based on the first image data, generating second image data comprising a plurality of pixels, wherein each pixel of the plurality of pixels of the second image data has a binarized tone value for each of the two or more colors, wherein
the generating the second image data includes:
selecting a first pixel from the plurality of pixels of the first image data;
performing a first comparison of the tone value of the first pixel with a first threshold
if the first comparison shows that the tone value of the first pixel is greater than the first threshold, binarizing the tone value of the first pixel by a first binarization process
if the first comparison shows that the tone value of the first pixel is less or equal than the first threshold, performing a second comparison of the tone value of the first pixel with a second threshold smaller than the first threshold, if the second comparison shows that the tone value of the second pixel is smaller than the second threshold, binarizing the tone value of the first pixel by a second binarization process different from the first binarization process, and if the second comparison shows that the tone value of the second pixel is equal or greater than the second threshold, binarizing the tone value of the first pixel by a third binarization process different from the first binarization process and the second binarization process, wherein the first binarization process includes setting the tone value of the first pixel to a first tone value that is greater than the first threshold, the second binarization process includes:

setting the tone value of the first pixel to a second tone value that is smaller than the second threshold; and distributing a value equivalent to the tone value of the first pixel to one or more second pixels of the plurality of pixels of the first image data different from the first pixel, the third binarization process includes:

executing an adjustment process of subtracting a predetermined value from a tone value of one or more third pixels of the plurality of pixels of the first image data different from the first pixel and adding the predetermined value to the tone value of the first pixel;

performing a third comparison of the tone value of the first pixel after the adjustment process with the first threshold;

if the third comparison shows that the tone value of the first pixel after the adjustment process is more than the first threshold, setting the tone value of the first pixel to the first tone value; and if the third comparison shows showing that the tone value of the first pixel after the adjustment process is equal to or less than the first threshold, setting the tone value of the first pixel to the second threshold, and wherein said selecting the first pixel includes selecting the first pixels one by one in order in the horizontal direction from each of the upper line to lower line of the first image data, the second binarization process includes selecting the one or more second pixels from pixels other than pixels binarized by setting the first tone value of the second tone value out of the plurality of pixels of the first image data, and the third binarization process includes selecting, from among the plurality of pixels of the first image data, the one or more third pixels from pixels other than pixels binarized by setting the first tone value of the second tone value.

2. The method of generating image data of claim 1, wherein the predetermined value is 0 when the tone value of the one or more third pixels is equal to or less than the first threshold, and the predetermined value is a positive value that is smaller than a value obtained by subtracting the first threshold from the tone value of the one or more third pixels when the tone value of the one or more third pixels is greater than the first threshold.

3. The method of generating image data of claim 1, further comprising, before generation of the second image data, setting, for each color of the two or more colors, a magnitude of the first threshold and a magnitude of the second threshold to be used in generation of the second image.

4. The method of generating image data of claim 3, wherein said setting the magnitude of the first threshold and the magnitude of the second threshold to be used in generation of the second image data include:

acquiring third image data corresponding to part of the first image data, the third image data comprises a plurality of pixels;

for each combination of a plurality of magnitude combinations for the first threshold and of the second threshold, binarizing a tone value of each pixel of the plurality of pixels of the third image data by any of the first binarization process, the second binarization process, and the third binarization process to generate fourth image data comprising a plurality of pixels, each pixel of the plurality of pixels of the fourth image data having a binarized tone value; and setting the magnitude of the first threshold and the magnitude of the second threshold to be used in generation of the second image data to be a value of the first threshold and a value of the second threshold in a combination of the plurality of magnitude combinations, in which a summed value of differences in pixel between the third image data and the fourth image data is minimized.

5. The method of generating image data of claim 4, wherein the first image data includes a facial image data, and the third image data includes at least a part of the facial image data.

6. A method of producing a display, comprising:

transferring two or more types of display elements each including diffractive structures and displaying colors different from each other onto a transfer target, based on the second image data obtained by the method of producing image data of claim 1.

7. A display obtained by the production method of claim 6.

8. A method of generating image data, comprising:

acquiring first image data represented in two or more colors, the first image data comprises a plurality of pixels, wherein said acquiring comprises acquiring for each pixel of the plurality of pixels of the first image data, a tone value for each of the two or more colors; and based on the first image data, generating second image data comprising a plurality of pixels, wherein each pixel of the plurality of pixels of the second image data has a binarized tone value for each of the two or more colors, wherein the generating the second image data includes:

selecting a first pixel from the plurality of pixels of the first image data;

performing a first comparison of the tone value of the first pixel with a first threshold;

if the first comparison shows that the tone value of the first pixel is greater than the first threshold, binarizing the tone value of the first pixel by a first binarization process;

if the first comparison shows that the tone value of the first pixel is less or equal than the first threshold, performing a second comparison of the tone value of the first pixel with a second threshold smaller than the first threshold;

if the second comparison shows that the tone value of the second pixel is smaller than the second threshold, binarizing the tone value of the first pixel by a second binarization process different from the first binarization process, and if the second comparison shows that the tone value of the second pixel is equal or greater than the second threshold, binarizing the tone value of the first pixel by a third binarization process different from the first binarization process and the second binarization process, wherein the first binarization process includes setting the tone value of the first pixel to a first tone value that is greater than the first threshold, the second binarization process includes:

setting the tone value of the first pixel to a second tone value that is smaller than the second threshold; and distributing a value equivalent to the tone value of the first pixel to one or more second pixels of the plurality of pixels of the first image data different from the first pixel, the third binarization process includes:

executing an adjustment process of subtracting a predetermined value from a tone value of one or more third pixels of the plurality of pixels of the first image data different from the first pixel and adding the predetermined value to the tone value of the first pixel;

performing a third comparison of the tone value of the first pixel after the adjustment process with the first threshold;

if the third comparison shows that the tone value of the first pixel after the adjustment process is more than the first threshold, setting the tone value of the first pixel to the first tone value; and if the third comparison shows showing that the tone value of the first pixel after the adjustment process is equal to or less than the first threshold, setting the tone value of the first pixel to the second threshold, wherein the predetermined value is 0 when the tone value of the one or more third pixels is equal to or less than the first threshold, and the predetermined value is a positive value that is smaller than a value obtained by subtracting the first threshold from the tone value of the one or more third pixels when the tone value of the one or more third pixels is greater than the first threshold.

9. The method of generating image data of claim 8, further comprising, before generation of the second image data, setting, for each color of the two or more colors, a magnitude of the first threshold and a magnitude of the second threshold to be used in generation of the second image.

10. The method of generating image data of claim 9, wherein said setting the magnitude of the first threshold and the magnitude of the second threshold to be used in generation of the second image data include:

acquiring third image data corresponding to part of the first image data, the third image data comprises a plurality of pixels;

for each combination of a plurality of magnitude combinations for the first threshold and of the second threshold, binarizing a tone value of each pixel of the plurality of pixels of the third image data by any of the first binarization process, the second binarization process, and the third binarization process to generate fourth image data comprising a plurality of pixels, each pixel of the plurality of pixels of the fourth image data having a binarized tone value; and setting the magnitude of the first threshold and the magnitude of the second threshold to be used in generation of the second image data to be a value of the first threshold and a value of the second threshold in a combination of the plurality of magnitude combinations, in which a summed value of differences in pixel between the third image data and the fourth image data is minimized.

11. The method of generating image data of claim 10, wherein the first image data includes a facial image data, and the third image data includes at least a part of the facial image data.

12. A method of producing a display, comprising:

transferring two or more types of display elements each including diffractive structures and displaying colors different from each other onto a transfer target, based on the second image data obtained by the method of producing image data of claim 8.

13. A display obtained by the production method of claim 8.

14. A method of generating image data, comprising:

acquiring first image data represented in two or more colors, the first image data comprises a plurality of pixels, wherein said acquiring comprises acquiring for each pixel of the plurality of pixels of the first image data, a tone value for each of the two or more colors; and based on the first image data, generating second image data comprising a plurality of pixels, wherein each pixel of the plurality of pixels of the second image data has a binarized tone value for each of the two or more colors, wherein the generating the second image data includes:

selecting a first pixel from the plurality of pixels of the first image data;

performing a first comparison of the tone value of the first pixel with a first threshold;

if the first comparison shows that the tone value of the first pixel is greater than the first threshold, binarizing the tone value of the first pixel by a first binarization process;

if the first comparison shows that the tone value of the first pixel is less or equal than the first threshold, performing a second comparison of the tone value of the first pixel with a second threshold smaller than the first threshold;

if the second comparison shows that the tone value of the second pixel is smaller than the second threshold, binarizing the tone value of the first pixel by a second binarization process different from the first binarization process, and if the second comparison shows that the tone value of the second pixel is equal or greater than the second threshold, binarizing the tone value of the first pixel by a third binarization process different from the first binarization process and the second binarization process, and wherein the method further comprises before generation of the second image data, setting, for each color of the two or more colors, a magnitude of the first threshold and a magnitude of the second threshold to be used in generation of the second image, wherein said setting the magnitude of the first threshold and the magnitude of the second threshold to be used in generation of the second image data include:

acquiring third image data corresponding to part of the first image data, the third image data comprises a plurality of pixels;

for each combination of a plurality of magnitude combinations for the first threshold and of the second threshold, binarizing a tone value of each pixel of the plurality of pixels of the third image data by any of the first binarization process, the second binarization process, and the third binarization process to generate fourth image data comprising a plurality of pixels, each pixel of the plurality of pixels of the fourth image data having a binarized tone value; and setting the magnitude of the first threshold and the magnitude of the second threshold to be used in generation of the second image data to be a value of the first threshold and a value of the second threshold in a combination of the plurality of magnitude combinations, in which a summed value of differences in pixel between the third image data and the fourth image data is minimized.

15. The method of generating image data of claim 14 wherein the first image data includes a facial image data, and
the third image data includes at least a part of the facial image data.

16. A method of producing a display, comprising:

transferring two or more types of display elements each including diffractive structures and displaying colors different from each other onto a transfer target, based on the second image data obtained by the method of producing image data of claim 14.

17. A display obtained by the production method of claim 16.

* * * * *